United States Patent [19]

Lacombe et al.

[11] Patent Number: 4,536,484

[45] Date of Patent: Aug. 20, 1985

[54] PROCESS FOR PREPARATION OF A TRANSITION METAL COMPONENT FOR A CATALYTIC SYSTEM OF POLYMERIZATION OF OLEFINS

[75] Inventors: Jean-Loup Lacombe, Pau; Claude Brun, Idron Bizanos, both of France

[73] Assignee: Atochem, Courbevoie, France

[21] Appl. No.: 614,279

[22] Filed: May 25, 1984

[30] Foreign Application Priority Data

May 25, 1983 [FR] France ................ 83 08603

[51] Int. Cl.³ ............ C08F 4/62; C08F 4/64; C08F 4/68
[52] U.S. Cl. .................. 502/62; 502/104; 502/108; 502/115; 526/151; 526/125
[58] Field of Search .......... 502/62, 104, 108, 117, 502/115, 119

[56] References Cited

U.S. PATENT DOCUMENTS

| | | | |
|---|---|---|---|
| 3,094,568 | 6/1963 | Hay et al. | 502/117 X |
| 3,231,550 | 1/1966 | Manyik et al. | 502/115 X |
| 4,097,659 | 6/1978 | Creemers et al. | 502/115 X |
| 4,314,912 | 2/1982 | Lowery et al. | 502/115 |
| 4,347,157 | 8/1982 | Yamada et al. | 502/115 X |
| 4,461,846 | 7/1984 | Harris et al. | 502/108 X |

*Primary Examiner*—Patrick P. Garvin

*Attorney, Agent, or Firm*—Burgess, Ryan & Wayne

[57] ABSTRACT

A process for preparation of a transition metal component of a catalytic system for the polymerization of olefins, wherein an organo-magnesium-aluminum reaction product is formed by bringing into contact, a halogenated, alkylated or alkoxylated magnesium compound with an organo-aluminum compound, then subjecting the reaction product to a chlorination and to a treatment by a compound of a transition metal such as Ti, V, Zr and Cr.

As an organo-aluminum compound there is used one or several aluminoxane compounds of the formula

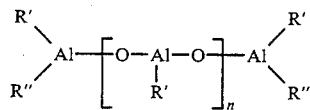

wherein R' is an alkyl or from $C_1$ to $C_{16}$, the R"s form together a radical —O— or designate each a radical R' and n is an integer of from 0 to 20.

The transition metal component obtained can be used in combination with a co-catalyst and eventually an electron donor to form a catalytic system apt to polymerize the alpha-olefins.

36 Claims, No Drawings

PROCESS FOR PREPARATION OF A TRANSITION METAL COMPONENT FOR A CATALYTIC SYSTEM OF POLYMERIZATION OF OLEFINS

The object of this invention is a process for preparation of a transition metal component for a catalytic system for polymerization of olefins. The invention also refers to a catalytic system including said component and likewise concerns itself with a process of synthesis of an olefin polymer or copolymer making use of said catalytic system.

It is known that olefinic polymers or copolymers of high molecular weights and low rate of ashes can be produced by polymerizing or copolymerizing olefins such as ethylene and the higher homologues thereof, especially propene, butene-1, pentene-1, methyl-4, pentene-1, hexene-1, octene-1, by means of catalytic systems of the Ziegler-Natta type resulting from the association of a transition metal component with a co-catalyst most frequently consisting of a hydrocarbylaluminum or hydrocarbyl-magnesium compound. The transition metal component is generally obtained by associating a transition metal compound, especially a titanium compound such as $TiCl_4$, $TiCl_3$ or an alkyl titanate, with a magnesium compound, especially a compound including $MgCl_2$ and eventually an electron-donor organic compound and if needed, an organic or inorganic porous carrier.

Already known is a process for the preparation of such a transition metal component, which consists in forming, at the very beginning, an organo-magnesium-aluminum reaction product or a complex soluble in hydrocarbons, by reaction, in an inert hydrocarbon, of a dialkyl magnesium or an alkyl magnesium halide with an alkyl aluminum, then subjecting the reaction product obtained to a chlorination by HCl and finally treating the resulting solid product of said chlorination, which includes $MgCl_2$, by a transition metal compound such as an alkyl titanate.

The applicant has found that improved results could be obtained by substituting an aluminoxane compound such as defined herebelow for the alkyl aluminum compound usually reacted with the dialkyl magnesium compound or alkyl magnesium halide to form the organo-magnesium-aluminum reaction product or complex.

In fact, the use of the aluminoxane compound results in a more active transition metal component that imparts a greater activity and better ability for copolymerization to the catalystic system resulting from the association of said component with a co-catalyst. Besides, the aluminoxane compound is less reactive than the alkyl aluminum compound and because of this its handling is facilitated.

The process according to the invention for the preparation of a transition metal component for a catalytic system of polymerization of olefins is of the type wherein an organo-magnesium-aluminum reaction product is formed by reaction, in a liquid medium, of a halogenated, alkylated or alkoxylated magnesium compound with an organo-aluminum compound; the reaction product is then subjected to a chlorination and to a treatment by a transition metal compound selected from the group consisting of Ti, V, Zr and Cr, and it is characterized by using as an organoaluminum compound at least one aluminoxane compound of the general formula

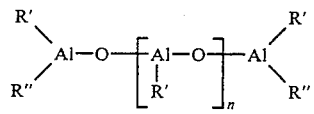

wherein R' designates an alkyl radical of from $C_1$ to $C_{16}$, and preferably $C_1$ to $C_{12}$, the R"s together form a bivalent radical —O— or designate each one a radical R' and n is an integer of from 0 to 20 and preferably, from 0 to 12.

The magnesium compound that is reacted with the aluminoxane compound corresponds to the formula $YaMg_mXb$, wherein Y designates an alkyl or alkoxy radical of from $C_1$ to $C_{12}$, preferably $C_1$ to $C_8$, X represents a radical Y or a halogen atom, and preferably a chlorine atom, m is a number equal to or more than 1, and a and b are numbers equal or greater than 0 and such that $a+b=m$.

Examples of such compounds are in particular ethyl magnesium chloride, butyl magnesium chloride, di n-butyl-magnesium, di isobutylmagnesium, di n-hexylmagnesium, di n-octylmagnesium and $(C_4H_9)_3Mg_2(C_2H_5)$.

The preferred aluminoxane compounds are those for which in the above cited formula R' and R" designate each an alkyl radical of from $C_1$ to $C_{12}$, and more suitably, $C_1$ to $C_6$, and n is an integer from 0 to 12 and more suitably, from 0 to 8. As examples of said compounds there can be cited tetraisobutyldialuminoxane (R'=R"=isobutyl; n=0) and hexaisobutyltetraaluminoxane (R'=R"=isobutyl; n=2).

The reaction between the magnesium compound of the formula $YaMg_mXb$ and the aluminoxane compound is carried out in a liquid medium inert in respect of reagents or also in the absence of such a medium if at least one of said reagents is a liquid. Said inert medium can especially consist of an aliphatic hydrocarbon such as pentane, heptane or hexane, or an aromatic hydrocarbon such as benzene, toluene, xylene, or also of a cyclo-aliphatic hydrocarbon such as cyclohexane or methyl cyclohexane, The temperature used for this reaction is not critical and can fluctuate, for example, from about $-40°$ C. to about the boiling temperature at the atmospheric pressure of the liquid medium used. The proportions of the magnesium compound of the formula $YaMg_mXb$ and of the aluminoxane compound that are caused to react one upon the other are advantageously such that the ratio of the number of moles of the magnesium compound to the number of moles of the aluminoxane compound in the reaction medium is between about 0.1 and 100, more suitably between about 0.5 and 20.

According to the invention, the organo-magnesium-aluminum product resulting from the reaction between the $YaMg_mXb$ compound and the aluminoxane compound is then subjected to a chlorination and to a treatment with a compound of a transition metal selected from among Ti, V, Zr and Cr.

The order in which the chlorination and the treatment with the transition metal compound are carried out is not critical. It is possible, for example, to subject the organo-magnesium-aluminum reaction product to chlorination, and then react the product resulting from the chlorination with the transition metal compound. It is also possible to operate in reverse order that is, to react the organo-magnesium-aluminum product with the transition metal compound and then subject the resulting product to chlorination.

The chlorination can be started by contacting the product to be chlorinated directly with a chlorination agent; but to obtain a satisfactory homogeneity, it is preferable to carry out the chlorination in an inert liquid medium, which can be similar to the one used for preparing the organo-magnesium-aluminum reaction product. The temperature used for the chlorination is not critical and can fluctuate, for example, between about 0° C. to 100° C. Especially suitable as chlorination agents are chlorine, $SOCl_2$, $SiCl_4$ and more suitably, anhydrous HCl. The quantity of chlorination agent is such that the ratio of the number of chlorine atoms furnished by the chlorination agent to the number of magnesium atoms of the $YaMg_mXb$ reacted with the aluminoxane compound is more than about 2 and in particular between about 2 and 100.

The treatment by the transition metal of the organo-magnesium-aluminum product or of the corresponding product resulting from the chlorination is likewise advantageously started in an inert liquid medium that is in particular analogous to the one used for the chlorination or for the preparation of the organo-magnesium-aluminum compound. Said treatment is carried out at a temperature that can broadly fluctuate and is particularly between about $-30°$ C. and 200° C. and more suitably between about 0° C. and 150° C. Preferred as convenient for this treatment are the Ti, V, Zr and Cr compounds selected from among $TiCl_4$, $TiCl_3$, $VCl_4$, $VOCl_3$, $CrCl_3$, $CrO_3$, vanadium acetylacetonate, chromium acetylacetonate, $Ti(OR)_pCl(4-p)$ and $Zr(OR)_pCl(4-p)$, R designating an alkyl radical of from $C_1$ to $C_8$ and p being an integer from 1 to 4. It is possible to carry out in a single step the chlorination and the treatment by the transition metal compound by sleecting as chlorination agent a Ti, V, Zr or Cr chloride and especially $TiCl_4$.

According to a special manner of carrying out the process according to the invention, the transition metal component is prepared in the presence of an adjuvant consisting of an inorganic or organic porous carrier that can be selected, for example, from the group formed by $SiO_2$, $Al_2O_3$, $TiO_2$, $ZrO_2$, the zeolites and the mixed oxides containing $SiO_2$ and one or several metal oxides taken from among $ZrO_2$, $TiO_2$, MgO and $Al_2O_3$. This adjuvant can be added to the reaction medium between said compounds or during the reaction, or also when the reaction involving the production of the organo-magnesium-aluminum compound is finished. In the case where the organo-magnesium-aluminum resulting from the reaction between the $YaMg_mXb$ magnesium compound and the aluminoxane compound is treated with a transition metal compound and the resulting product is then subjected to a chlorination, the adjuvant can be added to the medium proceeding from the treatment of the organo-magnesium-aluminum compound with the transition metal compound prior to the chlorination step. On the other hand, when the organo-magnesium-aluminum product is subjected to a chlorination and the resulting product of said chlorination is then treated with a transition metal compound, the product resulting from the chlorination is dissolved in an inert solvent, for example, tetrahydrofuran or also an alcohol such as methanol, and the adjuvant is impregnated by the solution obtained, the impregnated adjuvant being then treated with the transition metal compound. It is also possible to associate the adjuvant, by crushing together or blending in suspension in an inert liquid, with the product obtained at the end of that step of chlorination and treatment with the transition metal compound, which is the last step of chlorination and treatment with the transition metal compound, which is the last step in the process. It is possible to dissolve the product obtained at the end of said last step in an inert solvent, especially tetrahydrofuran or an alcohol such as methanol and impregnate the adjuvant with the resulting solution.

A donor of electrons consisting of a Lewis base can likewise be associated with the transition metal component. This can be directly effected by mixing at the end of the preparation of said component. It is also possible to incorporate the electron donor into the transition metal component at any point in the process of obtention of the latter and in particular during the stage of reaction of the $YaMg_mXb$ magnesium compound with the aluminoxane compound or at the end of said stage and prior to the subsequent stage, which, depending on the specific case, can be the chlorination stage, the stage of treatment with the transition metal compound, or also the stage of addition of the adjuvant.

The electron donor can be advantageously selected from among the aliphatic or aromatic carboxylic acids and their alkylic esters, aliphatic or cyclic ethers, ketones, vinylic esters, acrylic derivatives, in particular alkyl acrylates or methacrylates, and silanes. Especially suitable as electron donors are compounds such as methyl paratoluate, ethyl benzoate, ethyl or butyl acetate, ethylic ether, ethyl paraanisate, tetrahydrofuran, dioxane, acetone, methylisobutylketone, vinyl acetate, methyl methacrylate and phenyltriethoxsilane.

In the preparation of the transition metal component the transition metal compound is used in a quantity such that said component contain in particular from about 0.01% to 40%, and more suitably from about 0.1% to 20%, by weight of transition metal.

When the adjuvant is used, the proportion thereof can constitute from about 5% to 99.5%, and more suitably from about 40% to 85%, of the weight of the transition metal component that contains it.

The quantity of the eventually present electron donor can fluctuate quite broadly. It is advantageouly in a range such that the ratio of the number of magnesium atoms of the transition metal component to the number of molecules of the electron donor be between about 0.5 and 200, and more suitably between about 1 and 100.

The transition metal component prepared as indicated above can be used in combination with a co-catalyst selected from among the organometal compounds of the metals of groups I to III of the Periodic Table of the Elements to constitute a catalytic system adequate for the polymerization of olefins.

The co-catalyst associated with the transition metal component is in particular selected from among the organomagnesium compounds of the formula $YaMg_mSb$, the isoprenyl-aluminum, the aluminoxanes defined above and the organoaluminum compounds of the formula $Al(R')_qMrHs$ wherein M represents Cl or OR', R' designates an alkyl radical of from $C_1$ to $C_{16}$ and preferably $C_1$ to $C_{12}$, while q, r and s are numbers such as $1 \leq q \leq 3$, $0 \leq r \leq 2$ and $0 \leq s \leq 2$ with $q+r+s=3$. The co-catalyst is preferably selected from among the isoprenylaluminum, the organomagnesium compounds of the formula $YaMg_mXb$ and the organoaluminum compounds of the formula $AlR'''_xCl(3-x)$ wherein $R'''$ designates an alkyl radical of $C_1$ to $C_8$ and x is a number such as $1 \leq x \leq 3$. Examples of these compounds are triethylaluminum, tri isopropylaluminum, tri isobutylaluminum, tri n-hexylaluminum, tri n-octylaluminum, diethylaluminum chloride, isoprenylaluminum, dibutylmagnesium, di n-hexylmagnesium, and the like.

The transition metal component and the co-catalyst are associated in proportions such that the ratio of the number of metal atoms of groups I to III of the Periodic Table of the Elements contained in the co-catalyst to the number of atoms of transition metal of said components is between about 0.5 and 1000, more suitably between about 1 and 400.

The catalytic system can be previously formed by bringing into contact the transition metal component with the co-catalyst prior to being brought into contact with the olefins to be polymerized. It is likewise possible to add the transition metal component and the co-catalyst separately in the polymerization zone of the olefins in order to form the catalytic system in situ.

Whether or not the transition metal component contains an electron donor, it is possible to add such a compound selected from among the above defined electron donors to the catalytic system resulting from the association of the co-catalyst with the transition metal component or even to the co-catalyst prior to bringing the latter into contact with the transition metal component to form the catalytic system, or simultaneously put into contact the electron donor with the two other components of the catalytic system. The quantity of electron donors is advantageously such that the ratio of the number of metal atoms of groups I to III of the Periodic Table of the Elements, especially of aluminum or magnesium, proceeding from the co-catalyst to the number of molecules of the electron donor, is between about 1 and 50.

The olefins susceptible of being polymerized or copolymerized by means of the catalytic system resulting from the association of the transition metal component according to the invention with the co-catalyst and eventually an electron donor such as defined above, include not only the hydrocarbons of $C_2$ to $C_{18}$ having a unique ethylenic unsaturation and particularly the monoolefins of $C_2$ to $C_{18}$ such as ethylene, propene, butene-1, pentene-1, hexene-1, methyl-4, pentene-1, octene-1, decene-1, dodecene-1, tridecene-1, hexadecene-1, octadecene-1, but also the conjugated and non-conjugated dienes, especially butadiene, isoprene, hexadiene-1,4, hexadiene-1,5, vinyl-norbornene, ethylidenenorbornene.

The above mentioned catalytic system can be very particularly used for the polymerization of monoolefins of $C_2$ to $C_{12}$ such as ethylene, propene, butene-1 and hexene-1.

It is especially possible to polymerize a unique monoolefin of $C_2$ to $C_{12}$ such as ethylene, propene, butene-1, hexene-1 in contact with the catalytic system for the purpose of producing the homopolymer corresponding to said monoolefin.

It is also possible to polymerize mixtures of at least two olefins of $C_2$ to $C_{12}$ in contact with said catalytic system in order to produce copolymers of said olefins. It is especially possible to polymerize mixtures of ethylene and one or more alphaolefins of $C_3$ to $C_{12}$, said mixture containing, when in contact with the catalytic system, a global molar proportion of alpha-olefins of from $C_3$ to $C_{12}$ between about 0.1 and 90% and more suitably between about 1 and 60%.

It is likewise possible to polymerize mixtures of propene with the ethylene and/or one or more alpha-olefins of from $C_4$ to $C_{12}$, said mixtures containing, when in contact with the catalytic system, a global molar proportion of ethylene and/or alphaolefins of from $C_4$ to $C_{12}$ between about 0.1 and 90% and more suitably between about 1 and 60%.

It is also possible to polymerize mixtures of ethylene and of propene, with or without other alpha-olefins or diolefins, such that the molar ratio ethylene:propene is between about 0.02 and 50 and more suitably, between about 0.05 and 1.

The polymerization of the above mentioned olefins, and in particular of monoolefins of from $C_2$ to $C_{12}$ taken alone or in mixtures, as indicated above, by means of the previously defined catalytic system can be started in solution or in suspension in an inert liquid medium and especially in an aliphatic hydrocarbon such as n-heptane, n-hexane, isobutane, or even in a mass in at least one of the olefins to be polymerized maintained in a liquid or hypercritical state.

The operating conditions, specially temperatures, pressures, quantity of catalytic system for these polymerizations in liquid phase, are those customarily proposed for similar cases making use of conventional catalytic systems of the Ziegler Natta type supported or not.

For example, for a polymerization conducted in suspension or in solution in an inert liquid medium, it is possible to operate at temperatures of up to about 250° C. and under pressures from about atmospheric pressure to about 250 bars. In case of a polymerization in a liquid propene medium, the temperatures can go up to about 250° C. and the pressures can be between about atmospheric pressure and 50 bars. For a polymerization or copolymerization of ethylene in a mass resulting in polyethylenes or copolymers containing mostly ethylene, it is possible to operate at temperatures between about 130° C. and 350° C. and under pressures between about 200 and 3500 bars.

The catalytic system obtained by association of the transition metal component according to the invention with a co-catalyst and eventually an electron donor such as defined above can also be used for the polymerization in gaseous phase of the olefins or mixtures of olefins that have been cited. It is possible in particular to polymerize in gaseous phase by contact with said catalytic system a mixture of ethylene and of one or more alpha-olefins of from $C_3$ to $C_{12}$ such as propene, butene-1, hexene-1, methyl-4 pentene-1 and octene-1, containing, when in contact with the catalytic system, a molar proportion of alpha-olefin or alpha-olefins of from $C_3$ to $C_{12}$ between about 0.1 and 90%, and more suitably between about 1 and 60%, for the purpose of producing an ethylene/alpha-olefin copolymer with a minor molar content of alpha-olefin of from $C_3$ to $C_{12}$ known by the name as low-density linear polyethyelenes.

The polymerization in gaseous phase of the olefin or olefins in contact with the catalytic system can be carried out in any reactor that allows a polymerization in gaseous phase and in particular a reactor with a stirred or fluidized bed. The conditions for carrying out the polymerization in the gaseous phase, especially temperature, pressure, injection of the olefin or olefins in the stirred or fluid bed reactor, control of the polymerization temperature and pressure, are analogous to those proposed in the prior art for the polymerization in gaseous phase of olefins. The work is generally conducted at a temperature below the melting point Tf of the polymer or copolymer to be synthesized, and more particularly between about −20° C. and (Tf-5)°C., and under a pressure such that the olefin or olefins and eventually the other hydrocarbonated monomers present in the ractor are essentially in the vapor phase.

The polymerization in solution, in suspension, in a mass, or in gaseous phase can be carried out in the presence of a chain-transfer agent, expecially hydrogen or also an alkyl zinc such as diethyl zinc, so as to control the melting index of the polymer or copolymer ot be produced. The preferred chain-transfer agent is hydrogen, which is used in a quantity of up to about 80% and more suitably between about 0.1 and 40% of the volume of the combination of olefins and hydrogen brought to the reactor.

The transition metal component according to the invention can also be used as a transition metal component for the preparation of the active hydrocarbonated solid that can be used for polymerizing olefins such as defined in French patent application No. 83 03229 of Feb. 28, 1983 in the name of the applicant.

The transition metal component according to the invention can likewise be used for the preparation of an active prepolymer that can be used alone or combined with a co-catalyst selected from among the magnesium compounds of the formula $YaMg_mXb$, isoprenylaluminum, the aluminoxanes defined by the formula given above and the organoaluminum compounds of the formula $Al(R')_qM_rH_s$, to form a catalytic system that can be used for the polymerization or copolymerization in a mass of ethylene resulting in homopolymer polyethylenes or copolymers with a major content of ethylene like the ethylene copolymers and of one or more alpha-olefins of $C_3$ to $C_{12}$ known by the name of low-density linear polyethylenes by working under pressures of from about 200 to 3500 bars, and more suitably from about 800 to 2500 bars, and at temperatures of from about 130° C. to 350° C.

Said active prepolymer is obtained by bringing into contact one or more alphaolefins of $C_4$ to $C_{12}$ with a catalytic system formed by associating the transition metal component according to the invention with a co-catalyst selected among the compounds cited above for this purpose and used in the aforementioned proportions, said olefin or olefins of from $C_4$ to $C_{12}$ being used in quantities representing from about 2 to 100 moles, and more suitably from about 2 to 50 moles, of the olefin or olefins of from $C_4$ to $C_{12}$ per gram atom of transition metal of the transition metal component.

The invention is illustrated by the following non-limiting examples.

EXAMPLES 1 TO 6

Examples 1 to 5 are carried out according to the invention while Example 6 is given by way of comparison.

(a) Preparation of the transition metal component

The operation was carried out in a 1-liter reactor equipped with a stirring device and provided with a double jacket through which runs a heat conductor for maintaining the temperature of the reactor.

In the reactor, cleansed by the circulation of nitrogen, there were introduced an alkyl magnesium compound, an aluminoxane compound (Examples 1 to 5), or a chlorinated alkyl aluminum (Example 6), 100 ml heptane and eventually an electron donor. There was obtained a solution that was kept under stirring at 80° C. for two hours. After return to room temperature, 20 g silica were added to the contents of the reactor, the suspension obtained was then stirred for 30 minutes. The suspension thus formed was subjected to a chlorination by injecting anhydrous HCl at the rate of 0.5 mole/hour for 1 hours. After filtration of the reaction medium resulting from the chlorination, there was isolated a solid that was again put in suspension in the heptane. To the suspension thus obtained, $TiCl_4$ was then added and the whole was kept under stirring at room temperature for 1 hour. The reaction medium resulting from this treatment was then filtered, the solid collected was dried and then stored in a glove box in inert atmosphere.

The specific operating conditions of each example, the same as the composition of the titanium component obtained, are given in Table I.

TABLE I

| | Alkyl magnesium | | Aluminum compound | | Electron Donor | | $TiCl_4$ | Analysis of the transition metal component (% by weight) | | |
|---|---|---|---|---|---|---|---|---|---|---|
| Example | Nature | Quantity millimoles | Nature | Quantity millimoles | Nature | Quantity millimoles | millimoles | Mg | Ti | Al |
| 1 | DBM$^\alpha$ | 40 | TIBAO$^\gamma$ | 10 | — | — | 5 | 2.9 | 0.3 | 2.0 |
| 2 | DBME$^\beta$ | 50 | HIBTAO$^\delta$ | 12.5 | MPT$^\lambda$ | 1 | 7 | 3.3 | 0.7 | 3.3 |
| 3 | DBME | 60 | TIBAO | 15 | MPT | 1 | 7 | 3.5 | 0.65 | 2.1 |
| 4 | DBME | 30 | TIBAO | 7.5 | BE$^\mu$ | 1 | 5 | 1.8 | 0.9 | 1.2 |
| 5 | DBME | 60 | TIBAO | 15 | PTES$^\eta$ | 1 | 5 | 4 | 0.3 | 2.4 |
| 6 | DBME | 60 | DEAC$^\epsilon$ | 15 | MPT | 1 | 7 | 3.8 | 1 | 0.8 |

$^\alpha$DBM = dibutylmagnesium
$^\beta$DBME = $(C_4H_9)_3$ $Mg_2(C_2H_5)$
$^\gamma$TIBAO = tetraisobutyldialuminoxane
$^\delta$HIBTAO = hexaisobutyltetraaluminoxane
$^\epsilon$DEAC = diethyl aluminum chloride
$^\lambda$MPT = methyl paratoluate
$^\mu$BE = ethyl bezoate
$^\eta$PTES = phenyltriethoxysilane (b) Polymerization of ethylene and butene-1 in gaseous phase by contact with a catalytic system obtained from the transition metal component The operation was carried out in a reactor provided with a stirring rod rotating at a speed of 400 revolutions/minute, said reactor being heated to a temperature of 85° C. There were introduced in the stirred reactor, after drying and cleansing with nitrogen, 20 g of a low-density linear polyethylene having a particulate size distribution between about 800 and 1250 microns, and by way of co-catalyst, tri-n-hexylaluminum. There were then successively injected in the reactor 3 bars butene-1, 1.6 bars hydrogen and 11 bars ethylene. After terminating said injections, there was introduced in the reactor the titanium component obtained in part (a) of Examples 1 to 6, said introduction being effected by pressure with the aid of 2.5 bars nitrogen. After this introduction of the titanium component, the pressure in the reactor was brought to 20 bars by injecting ethylene. The pressure in the reactor was then kept at said amount by injecting a mixture of ethylene and butene-1 at a molar ratio butene-1:ethylene equal to 0.046. After 4 hours of reaction, the polymerization was arrested by relieving the pressure of the reactor, cleansing with nitrogen and cooling said reactor, and the ethylene/butene-1 copolymer formed was collected, said copolymer being known in the art by the name of low-density linear polyethylene.

The specific operating conditions of each example and the results obtained are given in Table II.

TABLE II

| Example | Composition of Titanium (mg) | TNHA$^a$ (millimoles) | Activity$^b$ | Characteristics of the copolymer | | |
|---|---|---|---|---|---|---|
| | | | | density | MI$^c$ | MFR$^d$ |
| 1 | 100 | 5 | 3000 | 0.922 | 3.1 | 32.2 |
| 2 | 100 | 5 | 3200 | 0.923 | 2.9 | 31.9 |
| 3 | 200 | 12 | 2850 | 0.921 | 0.82 | 32 |
| 4 | 80 | 5 | 3500 | 0.921 | 1.65 | 31.5 |
| 5 | 80 | 5 | 4350 | 0.922 | 1.8 | 31.4 |
| 6 | 200 | 12 | 2000 | 0.926 | 2.45 | 35.8 |

$^a$TNHA = tri n-hexylaluminum
$^b$Activity = gram of polymer produced per gram of titanium component and per hour
$^c$MI = melting index of $MI^{2.16}_{190°\,C.}$ determined according to the ASTMD standard 1238
$^d$MFR = ratio between the melting index $MI^{21.6}_{190°\,C.}$ and the melting index $MI^{2.16}_{190°\,C.}$ Comparing the results of Examples 2 (according to the invention) and 6 (control) carried out under similar operating condition, it appears that the transition metal component according to the invention results in a catalytic system having a substantially improved activity in relation to that of the catalytic system obtained from a transition metal component prepared by using a traditional organoaluminum compound (DEAC) for the reaction with the alkyl magnesium compound.

EXAMPLE 7

(a) Preparation of the transition metal component

The operation was carried out in a 1-liter reactor equipped with a stirring device and provided with a double jacket through which runs a heat-conducting fluid for maintaining the temperature of the reactor.

There were introduced in the reactor cleansed by circulating nitrogen, 40 millimoles dibutylmagnesium, 10 millimoles TIBAO and 100 ml heptane. The solution obtained was kept under stirring at 80° C. for 2 hours. After cooling to room temperature, 6 millimoles TiCl$_4$ were added to the contents of the reactor, and the reaction medium obtained was stirred for 30 minutes. There were then introduced 20 g silica in the reactor and the suspension obtained was stirred at room temperature for 1 hour, said suspension was then subjected to a chlorination by adding to the contents of the reactor anhydrous HCl, said addition being effected at the rate of 0.5 mole/hour for 1 hour. The reaction medium resulting from the chlorination treatment was then filtered and the solid collected was dried and then stored in a glove box in inert atmosphere. The solid obtained, which constitutes the transition metal component according to the invention, contained in weight 2.6% Mg, 1% Ti and 1.0% Al.

(b) Polymerization of ethylene and butene-1 in gaseous phase by contact with a catalytic system obtained from the transition metal component The operation was carried out in a reactor equipped with a stirring rod rotating at a speed of 400 revolutions/minute, said reactor being heated to a temperature of 85° C.

There were introduced in the stirred reactor, after being dried and cleansed with nitrogen, 20 g of a low-density linear polyethylene having a particulate size distribution between about 800 and 1250 microns and, by way of co-catalyst, 9 millimoles TNHA. There were then successively injected in the reactor 3 bars butene-1, 1.6 bars hydrogen and 11 bars ethylene. After terminating these injections, there were introduced in the reactor 200 mg of the titanium component obtained in part (a) of this example, said introduction being effected by pressure with the aid of 2.5 bars nitrogen. After said introduction of the titanium component, the pressure in the reactor was brought to 20 bars by injecting ethylene. The pressure in the reactor was then kept at this amount by injecting a mixture of ethylene and butene-1 in a molar ratio butene-1:ethylene equal to 0.046. After 4 hours of reaction, the polymerizaton was arrested by relieving the pressure of the reactor, cleansing with nitrogen and cooling said reactor, and the ethylene/butene-1 copolymer formed was collected. The copolymer produced, obtained with an activity of the catalytic system equal to 2500, had a density equal to 0.023, a melting index ($MI_{190°\,C.}^{2.16}$) of 2.5 and an MFR value equal to 32.

EXAMPLE 8

(a) Preparation of the transition metal component

The operation was carried out in a 1-liter reactor equipped with a stirring device and provided with a double jacket through which runs a heat-conducting fluid for maintaining the temperature of the reactor.

There were introduced in the reactor, cleansed by circulating nitrogen, 60 millimoles DBME, 15 millimoles TIBAO and 100 ml Heptane. The solution obtained was continuously stirred at 80° C. for two hours. After cooling to room temperature, the solution was subjected to a chlorination by injecting anhydrous HCl (0.5 mole/hour for 1 hour). There was obtained a precipitate that was treated with tetrahydrofuran to dissolve it. 20 g silica were added to the solution obtained and the suspension obtained was continuously stirred for 30 minutes at room temperature. The solid obtained after filtering this suspension was again dispersed in heptane. To the resulting suspension there were then added 10 millimoles TiCl$_4$ and the reaction medium was continuously stirred at room temperature for 1 hour. The contents of the reactor were then filtered and the solid fragment collected was dried, then stored in glove box under inert atmosphere. The solid obtained, which constitutes the transition metal component according to the invention, contained, by weight, 4.1% Mg, 1.2% Ti and 1.8% Al.

(b) Polymerization of ethylene and butene-1 in gaseous phase by contact of a catalytic system obtained from the transition metal component The operation was carried out as described in part (b) of Example 7 by using 150 mg of the titanium component prepared as indicated in part (a) of this example and a quantity of co-catalyst, namely TNHA, such that the ratio of the number of aluminum atoms proceeding from the co-catalyst to the number of titanium atoms of the titanium component was equal to 80. There was obtained, with an activity of the catalytic system equal to 3100, an ethylene-butene-1 copolymer having a density equal to 0.922, a melting index ($MI_{190° C.}^{2.16}$) of 1.85 and an MFR value equal to 36.

EXAMPLE 9

(a)

The operation was carried out in a 1-liter reactor equipped with a stirring device and provided with a double jacket through which runs a heat-conducting fluid to maintain the temperature of the reactor.

There are introduced in the reactor, cleansed by circulating nitrogen, 60 millimoles DBME, 15 millimoles HIBTAO, 1.8 millimoles MPT and 100 ml heptane. There was obtained a solution that was stirred at 80° C. for 2 hours. After cooling to room temperature, the solution was subjected to a chlorination by injecting anhydrous HCl (0.5 mole/hour for 1 hour) in the contents of the reactor. A precipitate was obtained that was separated by filtration and put back in suspension in the heptane. To the suspension obtained there were added 7 millimoles TiCl$_4$ and the reactio medium was then stirred continuously for 1 hour at room temperature. The contents of the reactor were then filtered and the solid fragment collected was dried and then stored in a glove box under inert atmosphere. The solid obtained, which constitutes the transition metal component according to the invention, contained, by weight, 13.6% Mg, 6% Al and 2.1% Ti.

(b) Polymerization of ethylene in suspension by contact with a catalytic system obtained from the transition metal component The operation was carried out in a reactor equipped with a stirring rod rotating at a speed of 350 revolutions/minute, said reactor being heated to a temperature of 85° C. throughout the polymerization.

There were successively introduced in the stirred reactor, after drying and cleansing with nitrogen, 2.5 l dry heptane 6 millimoles TNHA (co-catalyst), 0.6 millimole MPT (electron donor) and 50 mg of the titanium component obtained as indicated in part (a) of this Example and suspended in a hydrocarbonated oil. There were then injected in the reactor 1 bar hydrogen, then 5 bars ethylene, and the pressure inside the reactor was maintained at 6 bars by injection of ethylene. After 1 hour of reaction, the polymerization was arrested by relieving the pressure of the reactor and adding to the contents of the latter 20 ml of a mixture of methanol and HCl with 10% by weight of HCl, and the polyethylene formed was collected by filtration of the reaction medium. The polyethylene obtained, produced with an activity of 14000, had a density of 0.961, a melting index ($MI_{190° C.}^{2.16}$) equal to 0.06 and an MFR value of 36.7.

(c) Polymerization of propene in suspension by contact of a catalytic system obtained from the transition metal component The operation was carried out in a reactor equipped with a stirring rod rotating at a speed of 350 revolutions/minute, said reactor being kept at 65° C. throughout the polymerization.

There were successively introduced in the stirred reactor, after drying and cleansing with nitrogen, 2.5 l dry heptane, 12 millimoles tri-isobutylaluminum (co-catalyst) in the form of a complex with the ethyl para-anisate (electron donor) in a molar ratio tri-isobutylaluminum:ethyl paraanisate equal to 3, and 100 mg of the titanium component obtained like described in part (a) of this Example. There were then injected in the reactor 10 bars propene, and the pressure inside the reactor was then maintained at this amount by additional injection of propene. After 2 hours of reaction, the polymerizaton was arrested by relieving the pressure of the reactor and then adding to the contents of the latter 20 ml of a mixture of methanol and HCl with 10% by weight HCl, and the polypropylene formed was collected by filtration of the reaction medium. The polypropylene obtained, produced with an activity of the catalytic system equal to 3000, had an isotacticity index of 94%. By isotacticity index is understood the amount, expressed in percents, of the ratio of the weight of the solid residue of an extraction of polypropylene with n-heptane while operating with Soxhlet for two hours, to the weight of polypropylene subjected to extraction. This amount corresponds to the proportion by weight of the fraction called stereoregular in the polypropylene.

EXAMPLES 10 TO 12

(a) Preparation of the transition metal component

The operation was carried out in a 1-liter reactor equipped with a stirring device and provided with a double jacket through which runs a heat-conducting fluid for maintaining the temperature of the reactor.

There were introduced in the reactor, cleansed by circulating nitrogen, 20 g silica, 60 millimoles of the DBME component, of TIBAO by way of aluminoxane compound and 100 ml heptane. There was obtained a suspension that was continuously stirred for 2 hours at 80° C. After returning to room temperature, the suspension was filtered and the solid fragment collected was again suspended in the heptane. The suspension produced was subjected to a chlorination by adding anhydrous HCl. The reaction medium resulting from the chlorination was filtered, then returned to the suspension in the heptane. To the suspension formed were then added 10 millimoles TiCl$_4$ and the whole was continuously stirred at room temperature for 1 hour. The reaction medium resulting from this treatment was then filtered and the solid collected was dried and then stored in a glove box under inert atmosphere. The specific operating conditions of each example, the same as the results of the analysis of the titanium component obtained, are given in Table III.

TABLE III

| EXAMPLE | TIBAO (millimoles) | Analysis of the transition metal component (% by weight) | | |
|---|---|---|---|---|
| | | Mg | Ti | Al |
| 10 | 15 | 4.1 | 1 | 1.9 |
| 11 | 60 | 3.7 | 1.1 | 2.9 |
| 12 | 7.5 | 4.3 | 1.2 | 1.1 |

(b) Polymerization of ethylene and butene-1 in gaseous phase by contact of a catalytic system obtained from the transition metal component The operation was carried out like described in part (b) of Example 7 by using variable quantities of the titanium component prepared like indicated in part (a)

of this Example and of co-catalyst, namely TNHA. The specific operating conditions, the same as the characteristics of the ethylene/butene-1 copolymers obtained, are given in Table IV.

TABLE IV

| Example | Titanium component (mg) | TNHA milli-moles | Activity | Characteristics of the copolymer | | |
|---|---|---|---|---|---|---|
| | | | | density | $MI^{2.16}_{190°C}$ | MFR |
| 10 | 100 | 6 | 4350 | 0.924 | 1.1 | 35.4 |
| 11 | 250 | 12 | 3400 | 0.925 | 3.5 | 29.7 |
| 12 | 250 | 12 | 3800 | 0.924 | 2 | 33 |

EXAMPLE 13

(a) Preparation of the transition metal component

The operation was carried out in a 1-liter reactor equipped with a stirring device and provided with a double jacket through which a heat-conducting fluid runs for maintaining the temperature of the reactor.

There were introduced in the reactor, cleansed by circulating nitrogen, 60 millimoles DBME, 15 millimoles HIBTAO and 100 ml heptane. There was obtained a solution that was subjected to a chlorination by injecting anhydrous HCl (0.5 mole/hour for 1 hour) in the contents of the reactor. There was obtained a precipitate, which was separated by filtration and returned to suspension in the heptane. To the suspension obtained there were added 7 millimoles $TiCl_4$ and the reaction medium was then continuously stirred for 1 hour at room temperature. The contents of the reactor were then filtered and the solid fragment resulting from this filtration was returned to suspension in 100 ml heptane. The suspension obtained contained 0.11 g/l titanium.

(b) Polymerization of a mixture of ethylene and butene-1 in a mass and under high pressure in contact with a catalytic system obtained from the transition metal component The polymerization was carried out in a stirred reactor of the autoclave type having a 1-liter capacity. In the reactor, previously brought to 150° C., there was injected a mixture of ethylene and butene-1 in a ratio by weight of ethylene:butene-1 equal to 1:1, and a quantity of hydrogen corresponding to 1.5% to the global molar quantity of the ethylene, butene-1 and hydrogen reactants. At the end of the injection of said compounds, the pressure and temperature in the reactor respectively reached 1500 absolute bars and 150° C. There were then added to the contents of the reactor 5 millimoles triethylaluminum in solution in the heptane, then a quantity of the titanium component suspended in the heptane, obtained as indicated in part (a) of this example, corresponding to 0.1 millimole titanium, the latter addition producing a quick start of the polymerization reaction. There was obtained, with a massive conversion rate equal to 12% in relation to the initial mixture of ethylene and butene-1 injected in the reactor, an ethylene/butene-1 copolymer having a density equal to 0.934 and a melting index ($MI_{190°C}{}^{2.16}$) of 20.

This test was repeated using a mixture of ethylene and butene-1 containing, by weight, 60% butene-1, the other operating conditions remaining unchanged, and there was obtained an ethylene/butene-1 copolymer having a density equal to 0.920.

We claim:

1. A process for the preparation of a transition metal component for a catalytic system for the polymerization of olefins, wherein an organo-magnesium-aluminum reaction product is formed in a liquid medium of a halogenated alkylated magnesium compound or an alkylated magnesium compound with an organoaluminum compound, the reaction product being then subjected to a chlorination and to a treatment with a transition metal component selected from the group consisting of Ti, V, Zr and Cr, characterized by using as an organoaluminum compound, at least one aluminoxane compound of the formula

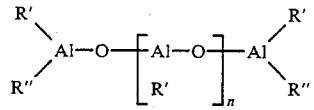

wherein R' designates an alkyl radical of from $C_1$ to $C_{16}$, the R"'s form together a bivalent —O— radical or designate each an R' radical and n is an integer from 0 to 20.

2. A process according to claim 1, wherein R' is an alkyl radical of $C_1$ to $C_{12}$.

3. A process according to claim 1, wherein the R"'s form together a bivalent —O— radical or designate each an R' radical and n is an integer of 0 to 12.

4. A process according to claim 1, wherein R' and R" are each an alkyl radical of $C_1$ to $C_{12}$, and n is an integer of 0 to 12.

5. A process according to claim 4 wherein n is an integer of from 0 to 8.

6. A process according to claim 1 wherein the magnesium compound is of the formula $YaMg_mXb$, wherein Y is an alkyl radical of $C_1$ to $C_{12}$, X is an alkyl of $C_1$ to $C_{12}$ or a halogen atom, m is a number equal to or above 1, while a and b are numbers equal to or above 0 and such that $a+b=2m$.

7. A process according to claim 6 wherein X and Y are alkyl radicals of $C_1$ to $C_8$.

8. A process according to claim 6 wherein the halogen atom is chlorine.

9. A process according to claim 1 characterized in that the quantities of the magnesium compound and of the aluminoxane compound reacted are such that the ratio of the number of moles of said magnesium compound to the number of moles of said aluminoxane compound are between about 0.1 and 100.

10. A process according to claim 9 wherein the ratio of magnesium compound to the number of moles of the aluminoxane compound is between about 0.5 and 20.

11. A process according to claim 1, characterized in that the reaction between said magnesium compound and said aluminoxane compound is carried out at a temperature going from about −30° C. to the boiling temperature under atmospheric pressure of the reaction liquid medium.

12. A process according to claim 11, characterized in that the reaction product between the magnesium compound and the aluminoxane compound is subjected to a chlorination and the product resulting from said chlorination is then treated with the transition metal compound.

13. A process according to claim 1, characterized in that the reaction product between the magnesium compound and the aluminoxane compound is treated with transition metal compound, and the product resulting from said treatment is then subjected to a chlorination.

14. A process according to claim 12, characterized in that an adjuvant consisting of an inorganic or organic porous carrier is incorporated into the reaction product between the magnesium compound and the aluminoxane compound, said incorporation being effected either during the formation of the reaction medium between said components or during the reaction, or even when the reaction is finished.

15. A process according to claim 12, characterized in that the product resulting from the chlorination is dissolved in an inert solvent, then an adjuvant consisting of an inorganic or organic porous carrier is impregnated by means of said solution and the impregnated adjuvant is treated with the transition metal compound.

16. A process according to claim 13, characterized in that an adjuvant consisting of an inorganic or organic porous carrier is incorporated into the reaction medium proceeding from the treatment with the transition metal compound prior to the chlorination.

17. A process according to claim 12, characterized in that the product, obtained at the end of the stage of chlorination and of treatment with the transition metal compound, which stage is the last in the process, is associated, by crushing together or by mixture in suspension in an inert liquid, with an adjuvant consisting of an inorganic or organic porous carrier.

18. A process according to claim 12, characterized in that the product obtained at the end of the stage of chlorination and of treatment with the transition metal compound, which stage is the last one in the process, is dissolved in an inert solvent and an adjuvant consisting of an inorganic or organic carrier is impregnated by means of said solution.

19. A process according to claim 14, characterized in that the adjuvant is selected from the group consisting of $SiO_2$, $TiO_2$, $Al_2O_3$, $ZrO_2$, the zeolites and the mixed oxides containing $SiO_2$ and one or more metal oxides of the group consisting of $ZrO_2$, $TiO_2$ $MgO$ and $Al_2O_3$.

20. A process according to claim 12, characterized in that the chlorination is carried out at a temperature going from about 0° C. to 100° C.

21. A process according to claim 12, characterized in that the chlorination agent is selected from the group consisting of chlorine, $SOCl_2$, $SiCl_4$ and anhydrous HCl.

22. A process according to claim 21 wherein the chlorination agent is anhydrous HCl.

23. A process according to claim 12, characterized in that the treatment with the transition metal compound is carried out at a temperature between about −30° C. and 200° C.

24. A process according to claim 23 wherein the process is conducted at a temperature between about 0° C. and 150° C.

25. A process according to claim 12, characterized in that the transition metal compound used for the treatment is selected from the group consisting of $TiCl_4$, $TiCl_3$, $VCl_4$, $VOCl_3$, $CrCl_3$, $CrO_3$, chromium acetylacetonate, vanadium acetylacetonate and the titanates and zirconates of the formulas $Ti(OR)_pCl(4-p)$ and $Zr(OR)_pCl(4-p)$, where R represents an alkyl radical of $C_1$ to $C_8$ and p designates an integer from 1 to 4.

26. A process according to claim 1, characterized in that an electron donor consisting of a Lewis base is associated with the transition metal component.

27. A process according to claim 26, characterized in that the quantity of electron donor used is such that the ratio of the number of magnesium atoms of the transition metal component to the number of molecules of the electron donor is between about 0.5 and 200.

28. A process according to claim 27 wherein the ratio is between about 1 and 100.

29. A process according to claim 1, characterized in that the quantity of transition metal compound used is such that the transition metal component contains from about 0.01% to 40% of transition metal.

30. A process according to claim 29 wherein the transition metal component contains from about 0.1% to 20% by weight of transition metal.

31. A catalytic system of polymerization of olefins resulting from the combination of a transition metal component with a co-catalyst selected among the organo-metal compounds of the metals of groups I to III of the Periodic Table of the Elements and eventually with an electron donor, characterized in that there is used a transition metal component obtained according to claim 1.

32. A catalytic system according to claim 31, characterized in that the transition metal component and the co-catalyst are combined in proportions such that the ratio of the number of metal atoms or groups I to III of the Periodic Table of the Elements proceeding from the co-catalyst to the number of transition metal atoms contained in said component is between about 0.5 and 1000.

33. A catalyst system according to claim 32 wherein the ratio is between about 1 and 400.

34. A catalytic system according to claim 31, charcterized in that the co-catalyst is selected from the group consisting of: (a) isoprenylaluminum; (b) the organomagnesium compounds of the formula $YaMg_mX_b$, wherein Y is an alkyl radical if $C_1$ to $C_{12}$, X is an alkyl of $C_1$ to $C_{12}$ or a halogen atom, m is a number equal to or above 1, while a and b are numbers equal to or above 0 and such that $a+b=2m$; (c) the organoaluminum compounds of the formula $AlR'''_xCl_{(3-x)}$, wherein R''' designates an alkyl radical of $C_1$ to $C_8$ and x is a number such that $1 \leq x \leq 3$ and (d) the aluminoxanes of the formula

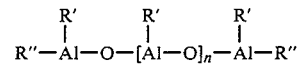

wherein R' designates an alkyl radical of from $C_1$ to $C_{16}$, the R''s form together a bivalent —O— radical or designate each an R' radical, and n is an integer of from 0 to 20.

35. A catalytic system according to claim 34, characterized in that is is formed by an active prepolymer obtained by bringing into contact one or more alpha-olefins of $C_4$ to $C_{12}$ with a catalytic system resulting from the association of the transition metal component with one or more of said co-catalysts, using from about 2 to 100 moles, alpha-olefin or alpha-olefins of from $C_4$ to $C_{12}$ per gram atom of transition metal present in the transition metal component, or from the association of said active prepolymer with at least one or said co-catalysts.

36. A catalyst system according to claim 35, wherein about 2 to 50 moles are used.

* * * * *